(12) United States Patent
Witkemper (10) Patent No.: US 8,898,014 B2
(45) Date of Patent: Nov. 25, 2014

(54) NAVIGATION SYSTEM WITH RANGE BASED NOTIFICATION ENHANCEMENT DELIVERY MECHANISM AND METHOD OF OPERATION THEREOF

(75) Inventor: Todd Matthew Witkemper, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 165 days.

(21) Appl. No.: 13/562,147

(22) Filed: Jul. 30, 2012

(65) Prior Publication Data

US 2014/0032104 A1 Jan. 30, 2014

(51) Int. Cl.
*G01C 21/00* (2006.01)
*G01C 21/36* (2006.01)
*G06Q 30/02* (2012.01)

(52) U.S. Cl.
CPC ........ *G01C 21/3679* (2013.01); *G01C 21/3682* (2013.01); *G01C 21/3685* (2013.01); *G01C 21/3694* (2013.01); *G06Q 30/0259* (2013.01); *G06Q 30/0241* (2013.01); *G06Q 30/0261* (2013.01)
USPC ........... 701/516; 701/445; 701/526; 701/538; 701/540; 701/541; 340/992; 340/995.14; 340/995.17; 340/995.25

(58) Field of Classification Search
CPC ........... G01C 21/3679; G01C 21/3682; G01C 21/343; G01C 21/26; G01C 21/20; G01C 21/34; G01C 21/3611; G06Q 10/0833; G07C 5/008; G08G 1/0112; G08G 1/096716; G08G 1/096775; G08G 1/005; H04W 40/20; H04W 64/003; H04L 29/08657
USPC ......... 701/408–410, 445, 516, 526, 527, 538, 701/540, 541; 340/992, 995.14, 995.17, 340/995.25
See application file for complete search history.

(56) References Cited

U.S. PATENT DOCUMENTS

| | | | |
|---|---|---|---|
| 5,179,385 A * | 1/1993 | O'Loughlin et al. | 342/176 |
| 6,144,318 A | 11/2000 | Hayashi et al. | |
| 6,320,495 B1 | 11/2001 | Sporgis | |
| 7,565,239 B2 * | 7/2009 | de Silva et al. | 701/426 |
| 7,584,051 B2 | 9/2009 | Hayashi | |
| 7,688,228 B2 * | 3/2010 | Tanizaki et al. | 340/995.12 |
| 7,889,101 B2 * | 2/2011 | Yokota | 340/995.19 |
| 2008/0033639 A1 * | 2/2008 | Nakamura et al. | 701/208 |
| 2009/0216569 A1 * | 8/2009 | Bonev et al. | 705/5 |
| 2009/0318163 A1 * | 12/2009 | George | 455/456.1 |
| 2010/0217723 A1 * | 8/2010 | Sauerwein et al. | 705/337 |
| 2010/0286901 A1 * | 11/2010 | Geelen et al. | 701/200 |
| 2011/0029228 A1 * | 2/2011 | Nakamura et al. | 701/200 |
| 2011/0087612 A1 * | 4/2011 | Yuasa et al. | 705/332 |

\* cited by examiner

*Primary Examiner* — Russell Frejd
(74) *Attorney, Agent, or Firm* — IP Investment Law Group (57) ABSTRACT

A method of operation of a navigation system includes: setting a delivery range for establishing a boundary; detecting a current location relative to the delivery range to a destination with the current location for locating a device; generating a travel route from the current location to the destination; selecting a delivery mode based on whether the current location is within the delivery range; and generating a local notification based on activating the delivery mode for displaying on the device.

24 Claims, 6 Drawing Sheets

NAVIGATION SYSTEM WITH RANGE BASED NOTIFICATION ENHANCEMENT DELIVERY MECHANISM AND METHOD OF OPERATION THEREOF

TECHNICAL FIELD

The present invention relates generally to a navigation system, and more particularly to a system for range based notification enhancement delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a notification delivery mechanism without enhancing the delivery of the notification has become a paramount concern for the consumer. The inability decreases the benefit of using the tool.

Thus, a need still remains for a navigation system with the notification delivery mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: setting a delivery range for establishing a boundary; detecting a current location relative to the delivery range to a destination with the current location for locating a device; generating a travel route from the current location to the destination; selecting a delivery mode based on whether the current location is within the delivery range; and generating a local notification based on activating the delivery mode for displaying on the device.

The present invention provides a navigation system, including: a range setter module for setting a delivery range for establishing a boundary; a locator module, coupled to the range setter module, for detecting a current location relative to the delivery range to a destination with the current location for locating a device; a route generator module, coupled to the locator module, for generating a travel route from the current location to the destination; a dispatch mode module, coupled to the route generator module, for selecting a delivery mode based on whether the current location is within the delivery range; and a notification module, coupled to the dispatch mode module, for generating a local notification based on activating the delivery mode for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
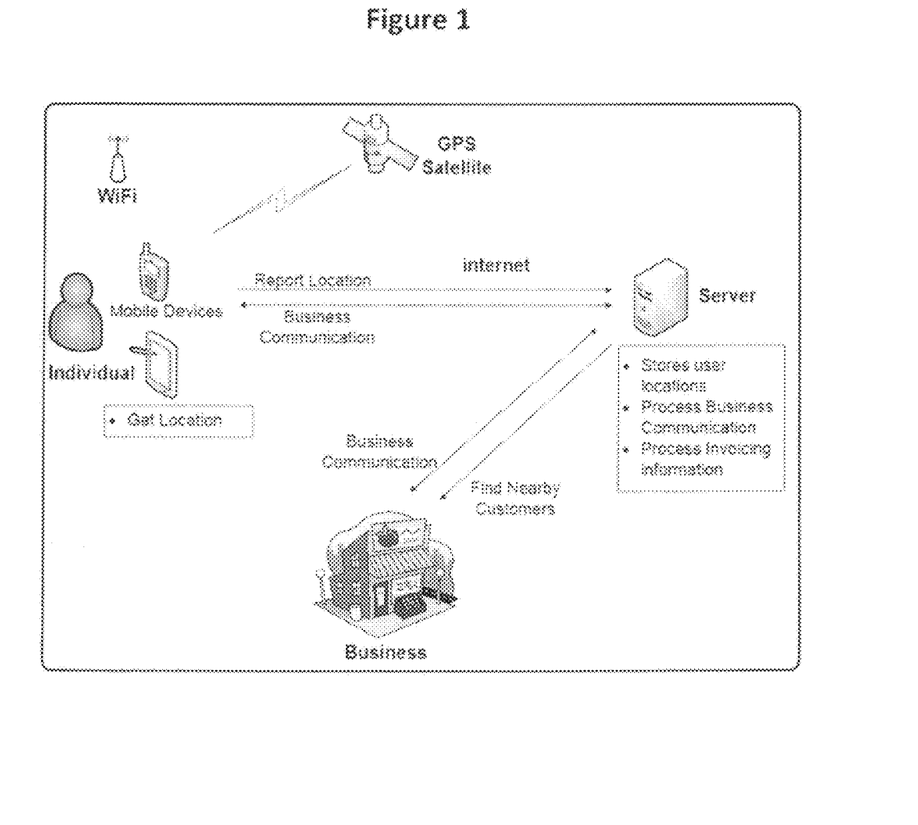
FIG. 1 is a navigation system with range based notification enhancement delivery mechanism in an embodiment of the present invention.

Referring now to FIG. 1, therein is shown a navigation system 100 with range based notification enhancement delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
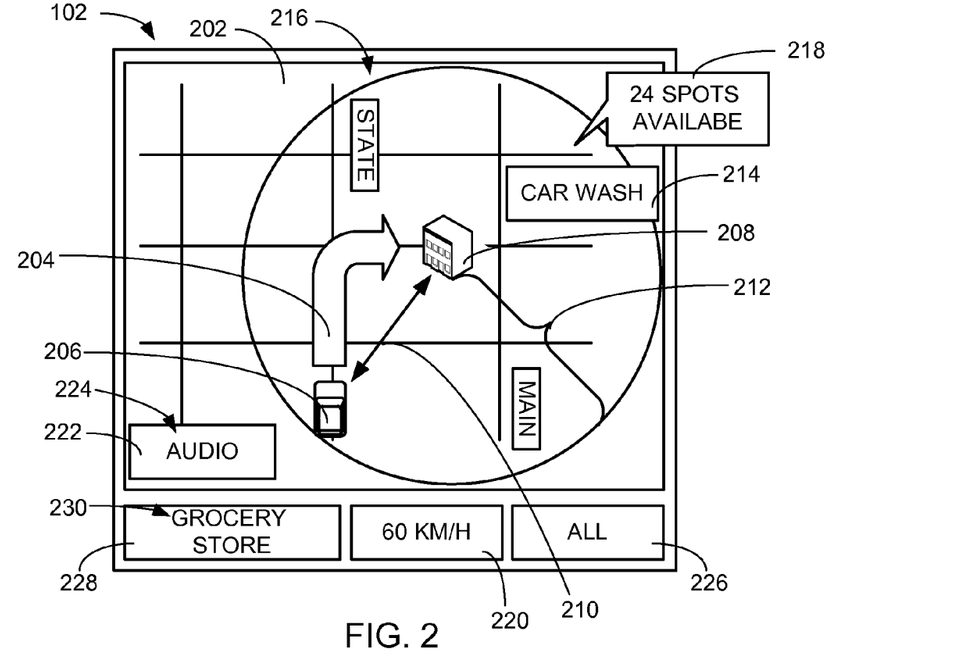
FIG. 2 is a first display example of a display interface of the first device.

Referring now to FIG. 2, therein is shown a first display example of a display interface 202 of the first device 102. For simplicity going forward, the discussion of the present invention will focus on the first device 102 displaying the result generated by the navigation system 100. However, the second device 106 of FIG. 1 and the first device 102 can be discussed interchangeably.

A travel route 204 is defined as a route for the user or the vehicle with the first device 102 to traverse from a current location 206 to reach a destination 208. For example, the travel route 204 can represent the route taken by a vehicle with the first device 102 to reach the destination 208.

The current location 206 is defined as the current physical location of the first device 102. For example, the current location 206 can represent the current physical location of the first device 102. The destination 208 is defined as the target geographic location to reach at the end of the travel. FIG. 2 illustrates a scenario where the vehicle with the first device 102 is traveling along the travel route 204 while operating a vehicle.

A distance 210 is defined as the physical distance from the current location 206 to the destination 208. The distance 210 can be measured based on calculating the physical distance of a particular road from the current location 206 to reach the destination 208.

A delivery range 212 is defined as a physical distance originating from the destination 208 where the navigation system 100 will deliver a local notification 214 when the current location 206 of the first device 102 is within that distance defined. For example, the delivery range 212 can represent a radius with the destination 208 as the center. For a further example, the delivery range 212 can be the radius of 1 kilometer from the destination 208.

For another example, the delivery range 212 can be a designated geographic region. For a further example, the delivery range 212 can represent the one block of neighborhood between State Street (St) and Main St. The geographic region can be designated by a boundary 216.

The boundary 216 is defined as the border line that establishes the limitation to the geographic region based on the delivery range 212. For example, the delivery range 212 can be 1 kilometer. The boundary 216 can establish a geographic region with a 1 kilometer radius from the destination 208.

The local notification 214 is defined as a notification that the navigation system 100 can deliver to the first device 102 when the current location 206 of the first device 102 is within the delivery range 212. For example, the local notification 214 can be a visual notification, an audio notification, or a combination thereof. The changes of the distance 210 can influence the navigation system 100 for the delivery of the local notification 214. Details regarding the distance 210 influence the delivery of the local notification 214 will be discussed later.

For a further example, the local notification 214 can represent a visual version of the notification from a car wash within the delivery range 212 notifying that a bargain for car wash is available. For another example, the navigation system 100 can deliver the local notification 214 representing a parking notification 218 for the availability of a parking space in the parking lot within the delivery range 212. Furthermore, the parking notification 218 can be an audio version of the notification stating that there are "24 spots available" at the parking lot.

The parking notification 218 is defined as the local notification 214 that provide information related to a parking location located within the delivery range 212. For example, the parking notification 218 can include information related to the space availability for street parking within the delivery range 212, the cost for parking at a parking lot, the safety ranking for parking locations within the delivery range 212, or a combination thereof.

A traffic speed 220 is defined as the speed of traffic along the travel route 204. For example, the vehicle with the first device 102 can be traveling along the travel route 204 at the traffic speed 220 of 60 kilometers per hour. The traffic speed 220 can influence a delivery mode 222 for the delivery of the local notification 214 by the navigation system 100. Details regarding the traffic speed 220 influencing the delivery mode 222 will be discussed later.

The delivery mode 222 is defined as a method of delivering the local notification 214 by the navigation system 100 to the first device 102. For example, the delivery mode 222 can include an audio mode 224.

The audio mode 224 is defined as the delivery mode 222 for the navigation system 100 to deliver the audio version of the local notification 214. For a specific example, the navigation system 100 with the audio mode 224 can deliver the audio version of the local notification 214 representing "24 spots available" for a parking lot within the delivery range 212. Other varieties of the delivery mode 222 will be discussed later.

A notification setting 226 is defined as a setting for the navigation system 100 that permits the navigation system 100 to customize the delivery of the local notification 214. For example, the navigation system 100 can customize the delivery of the local notification 214 by only permitting the delivery of the local notification 214 related to parking space availability at a parking lot within the delivery range 212.

By customizing the notification setting 226, the navigation system 100 can avoid delivering the local notification 214, such as "coffee of the day," to the first device 102 if the notification setting 226 is specifically set to deliver the parking notification 218. FIG. 2 illustrates the scenario where the notification setting 226 is set to all types of the local notification 214.

The user can enter an entry 228 into the first device 102. The entry 228 is defined as an input that the user, the navigation system 100, or a combination thereof can make into the first device 102. The entry 228 can be made via an oral command, a selection from a list, or a combination thereof.

For example, the user can make the entry for the destination 208. For another example, the navigation system 100 can make the entry 228 for a category of interest 230. The category of interest 230 is defined as the type of the destination 208.

For a specific example, the user can make the entry 228 for the category of interest 230 representing a coffee shop. The navigation system 100 can deliver the local notification 214 representing "coffee of the day" from a coffee shop named Starbucks™ located within the delivery range 212.

Figure 3:
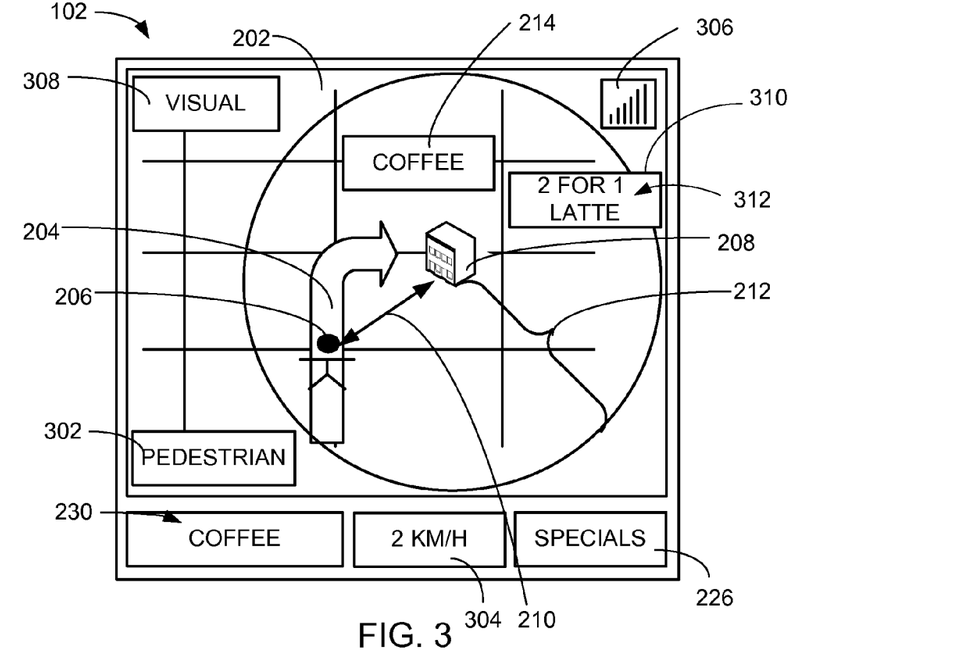
FIG. 3 is a second display example of the display interface of the first device.

Referring now to FIG. 3, therein is shown a second display example of the display interface 202 of the first device 102. FIG. 3 illustrates a scenario where the user with the first device 102 is walking from the current location 206 to the destination 208. When the user with the first device 102 is walking to the destination 208, the delivery mode 222 of FIG. 2 can be a pedestrian mode 302.

The pedestrian mode 302 is defined as the delivery mode 222 customized for when the user with the first device 102 is not operating a transportation mechanism, such as a vehicle, a motorcycle, or a bicycle, along the travel route 204. For example, the navigation system 100 with the pedestrian mode 302 can deliver the local notification 214 tailored to the user's interest to the first device 102 when the user is walking. For a specific example, if the user is operating a vehicle, the local notification 214 can be tailored to be displayed on the first device 102 for the user operating the vehicle. For a more specific example, the local notification 214 can be the parking notification 218 of FIG. 2 when the user is operating a vehicle.

A granularity 310 is defined as the level of detail presented in a content 312 of the local notification 214 for displaying on the first device 102 or the second device 106 of FIG. 1. The content 312 is defined as the information presented in the local notification 214. For example, in contrast to the previous example, the local notification 214 delivered by the navigation system 100 with the pedestrian mode 302 can have the content 312 that is more granular than the content 312 of the local notification 214 when the user is operating a vehicle. For example, the local notification 214 delivered when the user is operating the vehicle can be a notification for a sale in general from a major department store within the delivery range 212.

However, the local notification 214 delivered under the pedestrian mode 302 can be a notification for sales from each stores within the department store. The distance 210 from the current location 206 to the destination 208 can influence the granularity 310 of the content 312 of the local notification 214. Details regarding the distance 210 influencing the granularity 310 of the content 312 will be discussed later.

A pedestrian speed 304 is defined as the speed of how fast the user with the first device 102 is traveling along the travel route 204 without the aid of a transportation mechanism. For example, the user can be walking along the travel route 204 at the pedestrian speed 304 of 2 kilometers per hour. The pedestrian speed 304 can influence the delivery mode 222 to deliver the local notification 214 by the navigation system 100. Details regarding the pedestrian speed 304 influencing the delivery mode 222 will be discussed later.

A surrounding noise's loudness 306 is defined as the decibel level of the sound or noise surrounding the first device 102. For example, if the surrounding noise's loudness 306 surpasses a threshold noise level, the navigation system 100 can change the delivery mode 222 from the audio mode 224 of FIG. 2 to a visual mode 308, because the user can no longer hear the audio version of the local notification 214 from the first device 102. The threshold noise level is defined as a safe decibel level of the sound that a human being can safely listen. For example, the safe decibel level can be defined by the Environmental Protection Agency (EPA). For a specific example, the navigation system 100 can change the delivery mode 222 to the audio mode 224 if the decibel level surpasses 85 decibel.

The visual mode 308 is defined as the delivery mode 222 for the navigation system 100 to deliver the visual version of the local notification 214. For example, the notification setting 226 can be "special deals." For a specific example, the visual mode 308 of the delivery mode 222 can deliver the visual version of the local notification 214 representing "2 for 1 latte" for the category of interest 230 representing "coffee," because the surrounding noise's loudness exceeded a threshold noise level for the user to hear the audio version of the local notification 214 from the first device 102.

Figure 4:
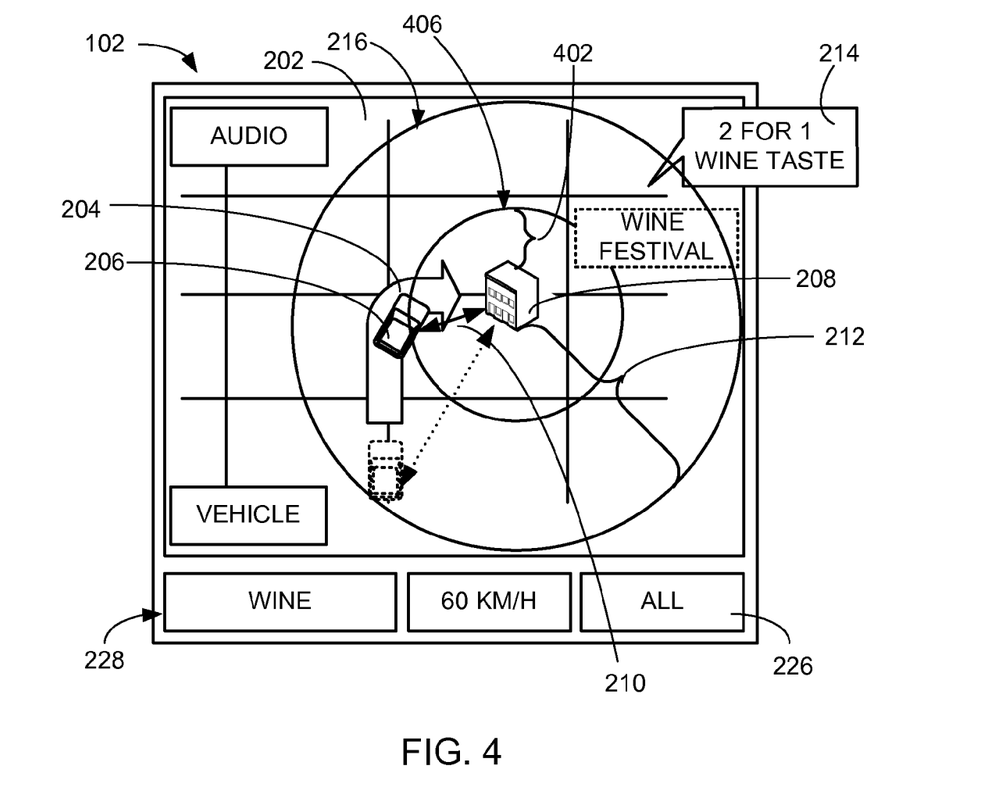
FIG. 4 is a third display example of the display interface of the first device.

Referring now to FIG. 4, therein is shown a third display example of the display interface 202 of the first device 102. FIG. 4 illustrates a scenario where the changes in the distance 210 can influence the delivery of the local notification 214 by the navigation system 100.

Multiple delivery ranges 402 are defined as the navigation system 100 setting more than one of the delivery range 212. For example, the first of the delivery range 212 can be 5 kilometer radius from the destination 208. The second of the delivery range 212 can be 1 kilometer radius from the destination 208. The multiple delivery ranges 402 can be the 5 kilometer radius and the 1 kilometer radius.

For another example, the navigation system 100 can set the multiple delivery ranges 402 differently. For a specific example, the navigation system 100 can set the first of the delivery range 212 for 1 kilometer for north of the destination 208 and can set the second of the delivery range 212 for 2 kilometers for east of the destination 208.

Multiple boundaries 406 are defined as the navigation system 100 establishing more than one of the boundary 216. Continuing from the previous example, the first of the boundary 216 can be established as a geographic region with the delivery range 212 of 5 kilometer radius from the destination 208. The second of the boundary 216 can be established as a geographic region with the delivery range 212 of 1 kilometer radius from the destination 208. The multiple boundaries 406 can be the geographic region with the 5 kilometer radius and the geographic region with the 1 kilometer radius. The multiple boundaries 406 can include the multiple delivery ranges 402, such as the delivery range 212 of 5 kilometer radius and the delivery range 212 of 1 kilometer radius from the destination 208.

In FIG. 4, the current location 206 changed for traveling along the travel route 204. As a result, the distance 210 from the current location 206 to the destination 208 is shortened, as the user with the first device 102 is closer to the destination 208.

The current location 206 prior to the change can be illustrated by spotted lines. The current location 206 prior to the change can be within the first of the delivery range 212 as discussed previously. While the user with the first device 102 is within the first of the delivery range 212, the navigation system 100 can deliver the local notification 214 representing "wine festival" to the first device 102.

As the user continues to travel along the travel route 204 and the distance 210 shortens, the user can be within the second of the delivery range 212 as discussed previously. Because the distance 210 between the current location 206 and the destination 208 is shortened, the navigation system 100 can deliver the local notification 214 that is more granular than the local notification 214 representing "wine festival" to the first device 102. For a specific example, the navigation system 100 can deliver the local notification 214 representing "2 for 1 wine tasting" to deliver the notification for a particular wine shop participating in the wine festival if the current location 206 of the first device 102 is within second of the delivery range 212.

It has been discovered that the present invention can change the granularity 310 of FIG. 3 of the content 312 of FIG. 3 of the local notification 214 presented on the first device 102 based on the current location 206 of the first device 102 in relations to each of the multiple delivery ranges 402. The controlling of the granularity 310 of the content 312 the local notification 214 can improve the safety of the operation of the navigation system 100 by delivering the content 312 that is pertinent and withholding the content 312 that is not. Furthermore, by changing the granularity 310 of the content 312 of the local notification 214, the navigation system 100 can minimize the distraction that can arise from receiving the local notification 214, thus, improving the safe operation of the navigation system 100.

Figure 5:
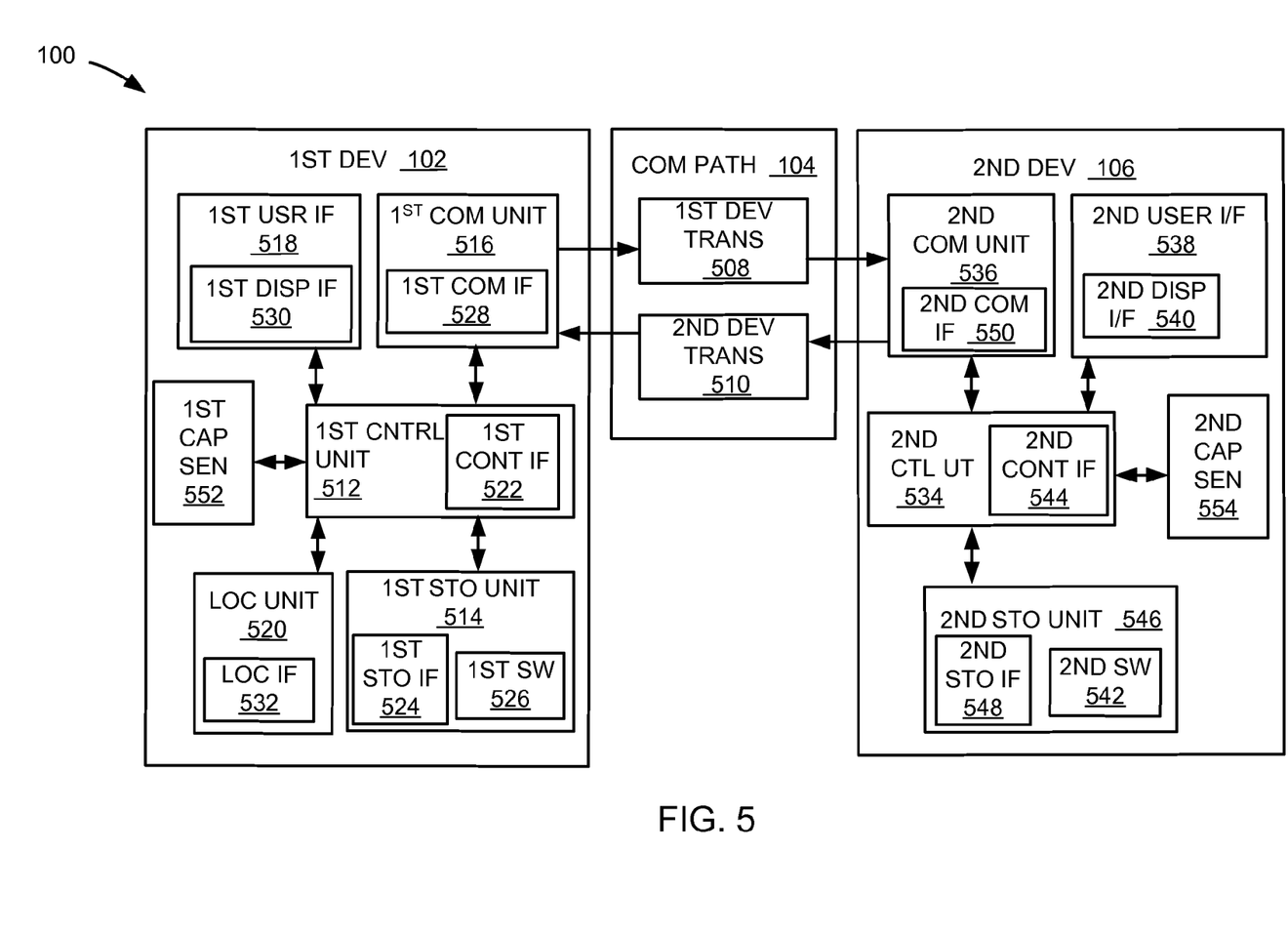
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as nonvolatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

A first capturing sensor 552 can capture the surrounding noise's loudness 306 of FIG. 3. The first capturing sensor 552 can capture the surrounding noise's loudness 306 from the outside, the inside, or the combination thereof of the user's vehicle. Examples of the first capturing sensor 552 can include an accelerometer, a microphone, a sound recording device, or a combination thereof.

A second capturing sensor 554 can capture the surrounding noise's loudness 306. The second capturing sensor 554 can the surrounding noise's loudness 306 from the outside, the inside, or the combination thereof of the user's vehicle. Examples of the second capturing sensor 554 can include can include an accelerometer, a microphone, a sound recording device, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
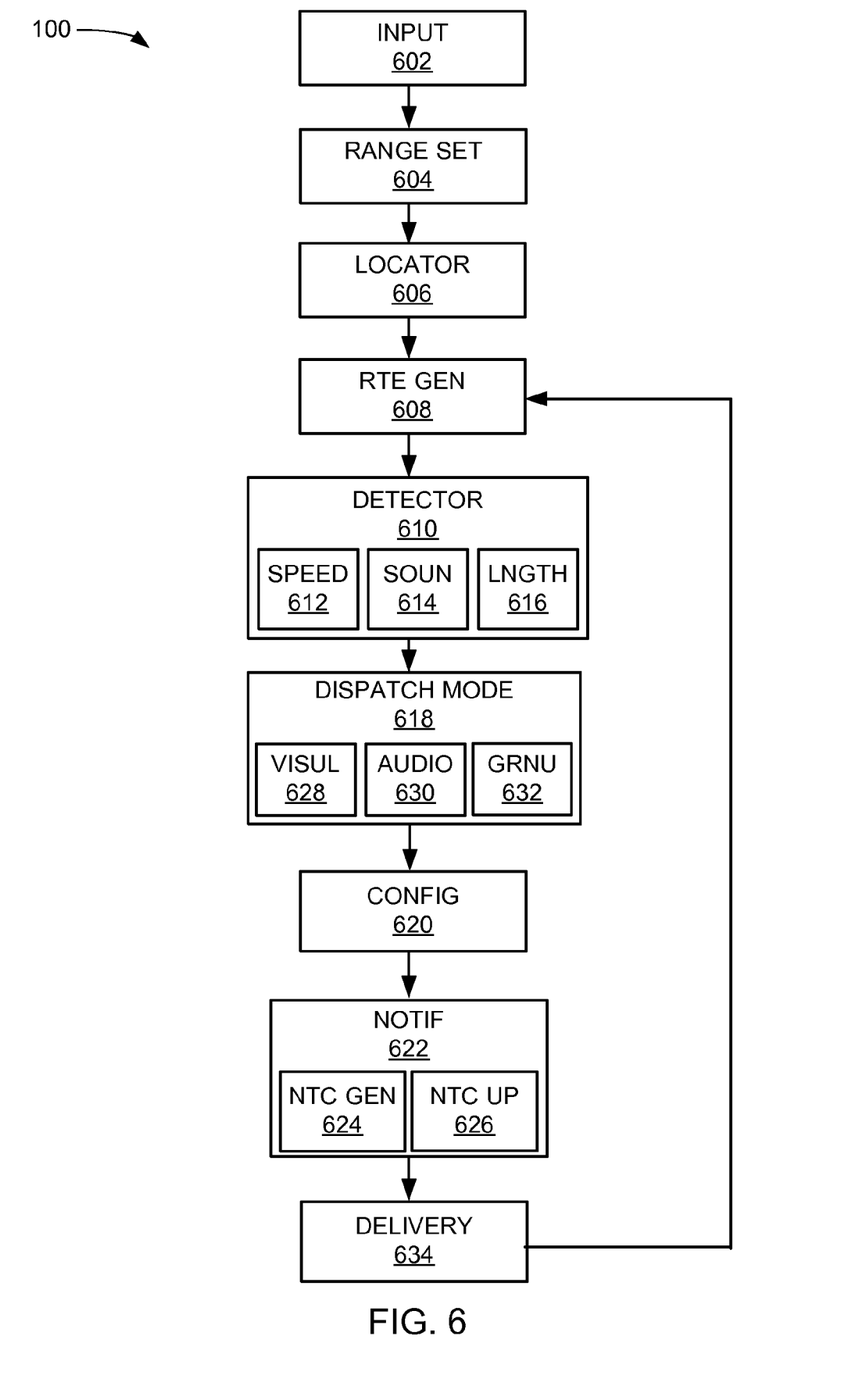
FIG. 6 is a control flow of the navigation system.

Referring now to FIG. 6, therein is shown a control flow of the navigation system 100. The navigation system 100 can include an input module 602. The input module 602 receives the input made by the user, the navigation system 100, or a combination thereof. For example, the input module 602 can receive the entry 228 of FIG. 2 for the category of interest 230 of FIG. 2, the destination 208 of FIG. 2, the delivery mode 222 of FIG. 2, the notification setting 226 of FIG. 2, or a combination thereof.

The navigation system 100 can include a range setter module 604, which can be coupled to the input module 602. The range setter module 604 sets the physical distance originating from the destination 208 where the navigation system 100 can receive the local notification 214 of FIG. 2. For example, the range setter module 604 can set the delivery range 212 of FIG. 2 for establishing the boundary 216 of FIG. 2.

The range setter module 604 can set the delivery range 212 in a number of ways. For example, the range setter module 604 can set the delivery range 212 by entering the delivery range 212 as part of the entry 228. For a specific example, the range setter module 604 can enter the delivery range 212 as 1 kilometer radius from the destination 208. For another example, the range setter module 604 can set the delivery range 212 by designating the geographic area of a city as the delivery range 212.

For a further example, the range setter module 604 can set the multiple delivery ranges 402 of FIG. 4 for establishing the multiple boundaries 406 of FIG. 4. For a specific example, the range setter module 604 can set the first of the delivery range 212 as the Santa Clara County, Calif. (CA) and the second of the delivery range 212 as Sunnyvale, Calif. for the multiple delivery ranges 402. The range setter module 604 can set the delivery range 212 based on the longitude/latitude coordinates of the borderline of the Santa Clara County or Sunnyvale. More specifically, the first of the delivery range 212 as the Santa Clara County can be established by the geographic area representing the Santa Clara County. And second of the delivery range 212 can represent the geographic area for Sunnyvale.

The navigation system 100 can include a locator module 606. The locator module 606 detects the current physical location of the first device 102 of FIG. 1. For example, the locator module 606 can detect the current location 206 of FIG. 2 relative to the delivery range 212 to the destination 208 with the current location 206 for locating the first device 102 of FIG. 2 via the location unit 520 of FIG. 5.

The navigation system 100 can include a route generator module 608, which can be coupled to the range setter module 604. The route generator module 608 generates a path from the current physical location of the first device 102 to the target geographic location. For example, the route generator module 608 can generate the travel route 204 of FIG. 2 from the current location 206 to the destination 208.

The navigation system 100 can include a detector module 610, which can be coupled to the locator module 606. The detector module 610 detects the speed of the traffic where the user with the first device 102 is traveling, the remaining distance from the current physical location of the first device 102 to the target geographic location, the noise level surrounding the first device 102, or a combination thereof.

The detector module 610 can detect in a number of ways. The detector module 610 includes a speed module 612. The speed module 612 detects the speed of traffic where the first device 102 is traveling. For example, the speed module 612 can detect the traffic speed 220 of FIG. 2 for monitoring the first device 102 by detecting the current speed of the first device 102 via the location unit 520. For another example, the speed module 612 can detect the pedestrian speed 304 of FIG. 3 for monitoring the first device 102 similar to detecting the traffic speed 220.

The detector module 610 includes a sound module 614. The sound module 614 detects the noise level surrounding the first device 102. For example, the sound module 614 can detect the surrounding noise's loudness 306 of FIG. 3 via the first capturing sensor 552 of FIG. 5.

The detector module 610 includes a length module 616. The length module 616 detects the changes of the physical distance from the current location 206 to the destination 208 as the user with the first device 102 travels along the travel route 204. For example, the length module 616 can detect the distance 210 of FIG. 2 changed from the current location 206 to the destination 208 within the delivery range 212. The length module 616 can detect the distance 210 changed by calculating the distance 210 from the current location 206 to the destination 208 within the delivery range 212 as the first device 102 changes the current location 206 by traveling along the travel route 204.

The navigation system 100 can include a dispatch mode module 618, which can be coupled to the detector module 610. The dispatch mode module 618 selects the type of delivery of the notifications to the first device 102. For example, the dispatch mode module 618 can select the delivery mode 222 based on whether the current location 206 is within the delivery range 212. The dispatch mode module 618 includes a visual mode module 628, an audio mode module 630 and a granulation module 632.

The dispatch mode module 618 can select the delivery mode 222 in a number of ways. For example, via the location unit 520, the visual mode module 628 can detect whether the current location 206 is within the delivery range 212 by detecting the GPS coordinates of the current location 206 in respect to the boundary 216 established by the delivery range 212. If the geographic area of a city is established as the boundary 216, the visual mode module 628 can determine whether the GPS coordinate of the current location 206 is within the geographic area of the city. The visual mode module 628 can activate the delivery mode 222 based on acknowledging that the current location 206 is within the delivery range 212 for delivering the local notification 214.

The granulation module 632 changes the granularity 310 of FIG. 3 of the content 312 of FIG. 3 of the local notification 214. For example, the granulation module 632 can change the granularity 310 of the content 312 of the local notification 214 based on the current location 206 relative to the delivery range 212.

For example, the visual mode module 628 can select the delivery mode 222 based on the distance 210 from the current location 206 to the destination 208 within the delivery range 212. The range setter module 604 can establish the multiple delivery ranges 402. The first of the delivery range 212 can be 5 kilometers and the second of the delivery range 212 can 1 kilometer.

If the current location 206 of the first device 102 is within the first of the delivery range 212, the visual mode module 628 can set the delivery mode 222 catered for the user operating a vehicle with the first device 102 by sending the local notification 214 that is less granular version of the content 312. If the current location 206 of the first device 102 is within the second of the delivery range 212, the visual mode module 628 can set the delivery mode 222 as the pedestrian mode 302 of FIG. 3. As illustrated in FIG. 4, the granulation module 632 can increase the granularity 310 of the content 312 of the local notification 214 by increasing the amount of the content 312 as the distance 210 between the current location 206 and the destination 208 shortens. For example, the visual mode module 628 can update the delivery mode 222 based on the distance 210 changed.

For a further example, the visual mode module 628 can select the pedestrian mode 302 as the delivery mode 222 based on the pedestrian speed 304. The visual mode module 628 can detect whether user with the first device 102 is walking or driving but stuck in traffic via the first capturing sensor 552 representing the accelerometer. More specifically, the visual mode module 628 can determine the difference between when the user is walking as oppose to driving by the difference of the acceleration. Subsequently, when the speed module 612 detects the user with the first device 102 to be walking, the visual mode module 628 can select the pedestrian mode 302 to deliver a more granular version of the content 312 of the local notification 214.

For a different example, the visual mode module 628 can select the visual mode 308 of FIG. 3 for the delivery mode 222 based on the surrounding noise's loudness 306 of FIG. 3. Trying to listen to the audio version of the local notification 214 can be difficult if the surrounding noise's loudness 306 exceeds a threshold noise level. When the sound module 614 detects the surrounding noise's loudness 306 to exceed a threshold noise level, the visual mode module 628 can select the visual mode 308 to deliver the visual version of the local notification 214. For example, the threshold noise level can be established at 85 decibels.

For a different example, the audio mode module 630 can select the audio mode 224 of FIG. 2 for the delivery mode 222 based on the traffic speed 220 of FIG. 2. Visually observing the local notification 214 when the traffic speed 220 is fast can be hazardous to the safe operation of the vehicle, the navigation system 100, or a combination thereof. When the speed module 612 detects the traffic speed 220 to exceed a speed limit, the audio mode module 630 can select the audio mode 224 to deliver the audio version of the local notification 214. For further example, the granulation module 632 can decrease the amount of the content 312 by shortening the audio version of the messages presented to the first device 102.

For another example, the visual mode module 628 and the audio mode module 630 can operate in combination. For a specific example, the visual mode module 628 can detect the vehicle with the first device 102 can be stuck in traffic by the stop and go acceleration of the vehicle. Under the circumstance, the visual mode module 628 can determine that the delivery of the local notification 214 can be hazardous to distract the driver, thus, can remain inactive for selecting the visual mode 308. As a result, the audio mode module 630 can select the audio mode 224 to deliver the audio version of the local notification 214 to minimize distraction for the driver.

The navigation system 100 can include a configurator module 620, which can be coupled to the dispatch mode module 618. The configurator module 620 customizes the type of the local notification 214 to be delivered to the first device 102. For example, the configurator module 620 can set the notification setting 226 of FIG. 2 for customizing the local notification 214.

The configurator module 620 can set the notification setting 226 in a number of ways. For example, the user can make the entry 228 for the notification setting 226 by requesting a delivery of the local notification 214 for parking space availability for parking lots within the delivery range 212. For another example, if the vehicle with the first device 102 is traveling in a high crime rate area at night, the configurator module 620 can set the notification setting 226 to deliver the local notification 214 related to crime rate information within the delivery range 212.

The navigation system 100 can include a notification module 622, which can be coupled to the configurator module 620. The notification module 622 generates a notification to be displayed, played, or a combination thereof on the first device 102. For example, the notification module 622 can generate the local notification 214 based on activating the delivery mode 222 for displaying on the first device 102.

The notification module 622 can generate the local notification 214 in a number of ways. The notification module 622 includes a notice generator module 624. The notice generator module 624 generates the notification to be displayed, played, or a combination thereof to the first device 102. For example, the notice generator module 624 can generate the local notification 214 based on activating the delivery mode 222 by detecting the distance 210 changed from the current location 206 to the destination 208 within the delivery range 212 for displaying on the first device 102.

For a specific example, the notice generator module 624 can receive the content 312 of the local notification 214 from external sources via the first control interface 522. The external sources can be a parking lot structure within the delivery range 212. The parking lot structure can transmit information for the parking space availability to the public. The notice generator module 624 can generate the parking notification 218 based on the information for the parking space availability.

For another example, the notice generator module 624 can subscribe to a notification from websites that offers coupons, such as Groupon.com™, to receive notifications for coupons for vendors within the delivery range 212. The notice generator module 624 can generate the local notification 214 based on the content 312 received from such websites.

For a different example, the notice generator module 624 can generate the local notification 214 based on the notification setting 226. As illustrated in FIG. 3, if the notification setting 226 is set to "special deals," the notice generator module 624 can generate the local notification 214 particularly for the content 312 related to "special deals," and not generate the local notification 214 unrelated to "special deals."

For a different example, the notice generator module 624 can generate the local notification 214 for the category of interest 230 of FIG. 2 within the delivery range 212. For a specific example, the notice generator module 624 can generate the local notification 214 for the category of interest 230 representing a grocery store. The local notification 214 can include parking space availability at the grocery store, bargain sale information at the grocery store, or a combination thereof.

For a different example, the notice generator module 624 can generate the local notification 214 relevant for each of the multiple delivery ranges 402. As illustrated in FIG. 4, the range setter module 604 can set the multiple delivery ranges 402 originating from the destination 208. The first of the delivery range 212 can be 5 kilometers and the second of the delivery range 212 can be 1 kilometer.

A liquor store named BevMo!™ can exist within the first of the delivery range 212. The notice generator module 624 can generate the local notification 214 for BevMo!™ if the current location 206 of the first device 102 is within the first of the delivery range 212, but prior to entering the second of the delivery range 212. Starbucks™ can be within the second of the delivery range 212. The notice generator module 624 can generate the local notification 214 for Starbucks™ when the current location 206 of the first device 102 is within the second of the delivery range 212.

The notification module 622 includes a notice updater module 626. The notice updater module 626 updates the notification displayed, played, or a combination thereof for the user. For example, the notice updater module 626 can update the local notification 214 based on the distance 210 changed.

The notice updater module 626 can update the local notification 214 in a number of ways. For example, the notice updater module 626 can update the local notification 214 for the category of interest 230 based on detecting the distance 210 changed from the current location 206 to the destination 208 within the delivery range 212.

For a specific example, the delivery range 212 can be 2 kilometers. The distance 210 from the current location 206 of the first device 102 to the destination 208 can be 1.9 kilometers. Starbucks™ can exist 1.5 kilometers from the destination 208. The notice generator module 624 can generate the local notification 214 for Starbucks™.

Continuing with the example, the distance 210 from the current location 206 of the first device 102 to the destination 208 can be changed to 1 kilometer. A coffee shop named Peet's Coffee™ can exist 0.8 kilometer from the destination 208. The notice updater module 626 can update the local notification 214 for the delivery of the local notification 214 for Peet's Coffee™.

For a different example, the notice updater module 626 can update the local notification 214 based on detecting the traffic speed 220 changed for playing on the first device 102. For a specific example, the speed module 612 can detect the increase of the traffic speed 220. The notice updater module 626 can update the local notification 214 to have a bigger font size for easier observation by the user. For another example, when the traffic speed 220 increases, the notice updater module 626 can update the local notification 214 by reducing the number of the local notification 214 delivered to reduce distraction for the user.

For a different example, the notice updater module 626 can update the local notification 214 based on detecting the surrounding noise's loudness 306 changed for displaying on the first device 102. For a specific example, the notice generator module 624 can generate the audio version of the local notification 214. The sound module 614 can detect the surrounding noise's loudness 306 to exceed the threshold noise level. The notice updater module 626 can update from the audio version to the visual version of the local notification 214.

For a different example, the notice updater module 626 can update the local notification 214 based on detecting the pedestrian speed 304 changed for displaying on the first device 102. For a specific example, the notice generator module 624 can generate the local notification 214 while the user is operating the vehicle. The traffic speed 220 can be 40 kilometers per hour. The speed module 612 can detect the decrease of the traffic speed 220 to 5 kilometers per hour. The speed module 612 can detect that the traffic speed 220 is converted to the pedestrian speed 304. By detecting the change into the pedestrian speed 304, the notice updater module 626 can update the local notification 214 that is more granular than the local notification 214 when the user was operating the vehicle.

The navigation system 100 can include a delivery module 634, which can be coupled to the notification module 622. The delivery module 634 delivers the local notification 214 to the first device 102.

For illustrative purposes, the navigation system 100 is shown with the route generator module 608 generating the travel route 204, although it is understood that the route generator module 608 can be operated differently. For example, the route generator module 608 can update the travel route 204 based on delivering the parking notification 218 for reaching the destination 208.

For a specific example, the delivery module 634 can deliver the parking notification 218 notifying that the parking lot near the destination 208 no longer has spaces available for the user to park the vehicle. Based on the unavailability, the route generator module 608 can generate the travel route 204 to a meter parking near the destination 208. The meter can be a smart meter that can deliver the availability information to the notification module 622.

The physical transformation from the changes of the distance 210 between the current location 206 and the destination 208 result in movement in the physical world, such as people using the first device 102, the vehicle, or a combination thereof, based on the operation of the navigation system 100. As the movement in the physical world occurs, the movement itself creates additional information that is converted back to the local notification 214, the delivery mode 222, the travel route 204, or a combination thereof for the continued operation of the navigation system 100 and to continue the movement in the physical world.

The first software 526 of FIG. 5 of the first device 102 of FIG. 5 can include the navigation system 100. For example, the first software 526 can include the input module 602, the range setter module 604, the locator module 606, the route generator module 608, the detector module 610, the dispatch mode module 618, the configurator module 620, the notification module 622, and the delivery module 634. The first user interface 518 of FIG. 5 can accept the entry 228.

The first control unit 512 of FIG. 5 can execute the first software 526 for the input module 602 to receive the entry 228. The first control unit 512 can execute the first software 526 for the range setter module 604 to set the delivery range 212. The first control unit 512 can execute the first software 526 for the locator module 606 to detect the current location 206 of the first device 102.

The first control unit 512 can execute the first software 526 for the route generator module 608 to generate the travel route 204 to the destination 208. The first control unit 512 can execute the first software 526 for the detector module 610 to detect the traffic speed 220, the surrounding noise's loudness 306, the distance 210 changed, or a combination thereof. The first control unit 512 can execute the first software 526 for the dispatch mode module 618 to set the delivery mode 222.

The first control unit 512 can execute the first software 526 for the configurator module 620 to set the notification setting 226. The first control unit 512 can execute the first software 526 for the notification module 622 to generate the local notification 214. The first control unit 512 can execute the first software 526 for the delivery module 634 to deliver the local notification 214 to the first device 102. The first control unit 512 can execute the first display interface 530 of FIG. 5 to display the local notification 214.

The second software 542 of FIG. 5 of the second device 106 of FIG. 5 can include the navigation system 100. For example, the second software 542 can include the input module 602, the range setter module 604, the locator module 606, the route generator module 608, the detector module 610, the dispatch mode module 618, the configurator module 620, the notification module 622, and the delivery module 634. The second user interface 538 of FIG. 5 can receive the entry 228.

The second control unit 534 of FIG. 5 can execute the second software 542 for the input module 602 to receive the entry 228. The second control unit 534 can execute the second software 542 for the range setter module 604 to set the delivery range 212. The second control unit 534 can execute the second software 542 for the locator module 606 to detect the current location 206 of the second device 106 of FIG. 5.

The second control unit 534 can execute the second software 542 for the route generator module 608 to generate the travel route 204 to the destination 208. The second control unit 534 can execute the second software 542 for the detector module 610 to detect the traffic speed 220, the surrounding noise's loudness 306, the distance 210 changed, or a combination thereof. The second control unit 534 can execute the second software 542 for the dispatch mode module 618 to set the delivery mode 222.

The second control unit 534 can execute the second software 542 for the configurator module 620 to set the notification setting 226. The second control unit 534 can execute the second software 542 for the notification module 622 to generate the local notification 214. The second control unit 534 can execute the second software 542 for the delivery module 634 to deliver the local notification 214 to the second device 106. The second control unit 534 can execute the second display interface 540 to display the local notification 214.

The navigation system 100 can be partitioned between the first software 526 and the second software 542. For example, the second software 542 can include the range setter module 604, the locator module 606, the route generator module 608, the detector module 610, the dispatch mode module 618, the configurator module 620, the notification module 622, and the delivery module 634. The second control unit 534 can execute modules partitioned on the second software 542 as previously described.

The first software 526 can include the input module 602. Based on the size of the first storage unit 514 of FIG. 5, the first software 526 can include additional modules of the navigation system 100. The first control unit 512 can execute the modules portioned on the first software 526 as previously described.

The first control unit 512 can operate the first communication unit 516 of FIG. 5 to send the entry 228 to the second device 106. The first control unit 512 can operate the first software 526 to operate the location unit 520 of FIG. 5.

The second communication unit 536 of FIG. 5 can send the local notification 214 to the first device 102 through the communication path 104 of FIG. 5. The local notification 214 can be displayed on the first display interface 530 and the second device 106.

It has been discovered that the present invention provides the navigation system 100 for providing safe operation of the navigation system 100 and other user interface system within a vehicle. The safe operation is provided by delivering the local notification 214 tailored to the environment where the user is using the navigation system 100. The navigation system 100 can deliver the visual version of the local notification 214 based on the surrounding noise's loudness 306 and the audio version of the local notification 214 based on the traffic speed 220 to reduce distraction that can endanger the user using the navigation system 100. Furthermore, generating the local notification 214 can aid the user to avoid high crime rate area and park the vehicle where the space is available.

The navigation system 100 describes the module functions or order as an example. The modules can be partitioned differently. For example, the notice generator module 624 and the notice updater module 626 can be combined. Each of the modules can operate individually and independently of the other modules.

Furthermore, data generated in one module can be used by another module without being directly coupled to each other. For example, the notification module 622 can receive the delivery mode 222 from the dispatch mode module 618. The input module 602, the range setter module 604, the locator module 606, the route generator module 608, the detector module 610, the dispatch mode module 618, the configurator module 620, the notification module 622, and the delivery module 634 can be implement in as hardware (not shown) within the first control unit 512, the second control unit 534, or special hardware (not shown) in the first device 102 or the second device 102.

Figure 7:
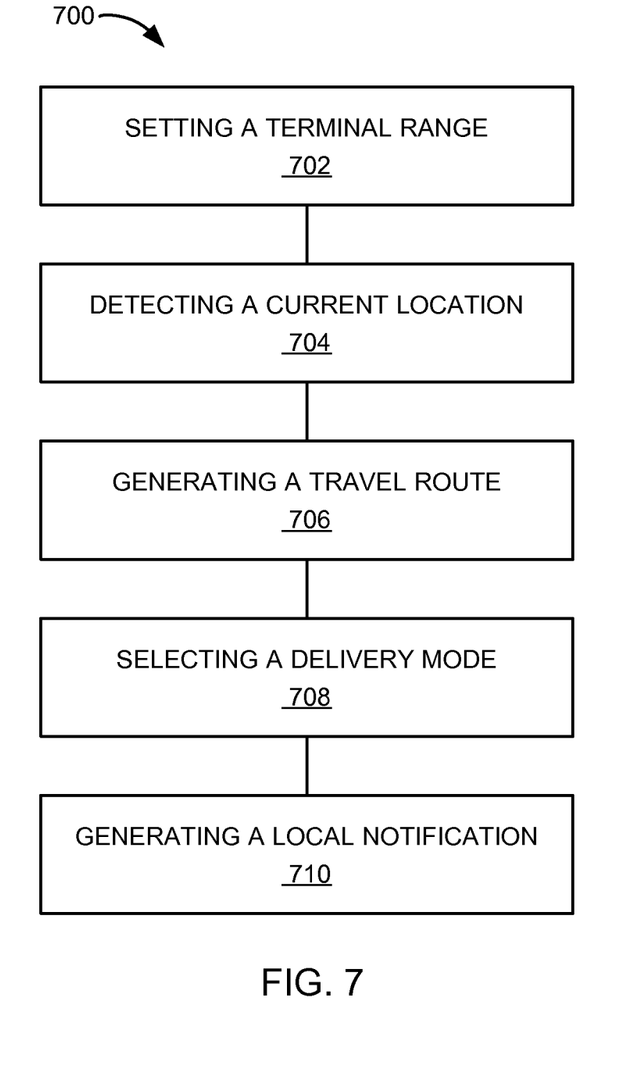
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: setting a delivery range for establishing a boundary in a block 702; detecting a current location relative to the delivery range to a destination with the current location for locating a device in a block 704; generating a travel route from the current location to the destination in a block 706; selecting a delivery mode based on whether the current location is within the delivery range in a block 708; and generating a local notification based on activating the delivery mode for displaying on the device in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   setting a delivery range for establishing a boundary;
   detecting a current location relative to the delivery range to a destination for locating a device;
   generating a travel route from the current location to the destination;
   selecting a delivery mode based on whether the current location is within the delivery range; and
   generating a local notification with a control unit based on activating the delivery mode for displaying on the device.

2. The method as claimed in claim 1 further comprising changing a granularity of a content of the local notification based on the current location relative to the delivery range.

3. The method as claimed in claim 1 wherein:
   setting the delivery range includes setting multiple delivery ranges for establishing multiple boundaries; and
   generating the local notification includes customizing the local notification to each of the multiple delivery ranges.

4. The method as claimed in claim 1 wherein:
   generating the local notification includes generating a parking notification; and
further comprising:
   updating the travel route based on delivering the parking notification for reaching the destination.

5. The method as claimed in claim 1 further comprising:
   detecting a distance changed from the current location to the destination within the delivery range; and
   updating the delivery mode based on the distance changed.

6. The method as claimed in claim 1 wherein:
   selecting the delivery mode includes:
      detecting a surrounding noise's loudness,
      selecting a visual mode based on the surrounding noise's loudness, and
further comprising:
   updating the local notification based on detecting the surrounding noise's loudness changed for displaying on the device.

7. A method of operation of a navigation system comprising:
   setting a delivery range for establishing a boundary;
   detecting a current location relative to the delivery range to a destination for locating a device;
   generating a travel route from the current location to the destination;
   calculating a distance from the current location to the destination within the delivery range;
   selecting a delivery mode based on the distance from the current location to the destination within the delivery range; and
   generating a local notification with a control unit based on activating the delivery mode by detecting the distance changed from the current location to the destination within the delivery range for displaying on the device.

8. The method as claimed in claim 7 wherein:
   selecting the delivery mode includes:
      detecting a traffic speed for monitoring the device,
      selecting an audio mode based on the traffic speed, and
further comprising:
   updating the local notification based on detecting the traffic speed changed for playing on the device.

9. The method as claimed in claim 7 further comprising:
   detecting a distance changed from the current location to the destination within the delivery range; and
   updating the local notification based on the distance changed.

10. The method as claimed in claim 7 wherein:
    selecting the delivery mode includes:
       detecting a pedestrian speed for monitoring the device,
       selecting a pedestrian mode based on the pedestrian speed, and
further comprising:
    updating the local notification based on detecting the pedestrian speed changed for displaying on the device.

11. The method as claimed in claim 7 further comprising:
    receiving an entry for a category of interest; and
wherein:
    generating the local notification includes:
       generating the local notification for the category of interest within the delivery range, and
       updating the local notification for the category of interest based on detecting the distance changed from the current location to the destination within the delivery range.

12. The method as claimed in claim 7 further comprising:
    setting a notification setting for customizing the local notification; and
wherein:
    generating the local notification includes generating the local notification based on the notification setting.

13. A navigation system comprising:
    a control unit is for:
       setting a delivery range for establishing a boundary;
       detecting a current location relative to the delivery range to the destination for locating a device;
       generating a travel route from the current location to the destination;
       selecting a delivery mode based on whether the current location is within the delivery range;
       generating a local notification based on activating the delivery mode; and
    a display interface, coupled to the control unit for displaying the local notification.

14. The system as claimed in claim 13 further comprising a granulation module, coupled to the route generator module, for changing a granularity of a content of the local notification based on the current location relative to the delivery range.

15. The system as claimed in claim 13 wherein:
    the range setter module is for setting multiple delivery ranges for establishing multiple boundaries; and
    the notification module is for generating the local notification relevant for each of the multiple delivery ranges.

16. The system as claimed in claim 13 wherein:
the notification module is for generating a parking notification; and
the route generator module is for updating the travel route based on delivering the parking notification for reaching the destination.

17. The system as claimed in claim 13 further comprising:
a detector module, coupled to the route generator module, for detecting a distance changed from the current location to the destination within the delivery range; and
wherein:
the dispatch mode module is for updating the delivery mode based on the distance changed.

18. The system as claimed in claim 13 further comprising:
a detector module, coupled to the route generator module, for detecting a surrounding noise's loudness;
wherein:
the dispatch mode module is for selecting a visual mode based on the surrounding noise's loudness; and
the notification module is for updating the local notification based on detecting the surrounding noise's loudness changed for displaying on the device.

19. The system as claimed in claim 13 further comprising:
a detector module, coupled to the route generator module, for calculating a distance from the current location to the destination within the delivery range; and
wherein:
the dispatch mode module is for selecting a delivery mode based on the distance from the current location to the destination within the delivery range; and
the notification module is for generating a local notification based on activating the delivery mode by detecting the distance changed from the current location to the destination within the delivery range for displaying on the device.

20. The system as claimed in claim 18 wherein:
the detector module is for detecting a traffic speed for monitoring the device;
the dispatch mode module is for selecting an audio mode based on the traffic speed; and
the notification module is for updating the local notification based on detecting the traffic speed changed for playing on the device.

21. The system as claimed in claim 18 wherein:
the detector module is for detecting a distance changed from the current location to the destination within the delivery range; and
the notification module is for updating the local notification based on the distance changed.

22. The system as claimed in claim 18 wherein:
the detector module is for detecting a pedestrian speed for monitoring the device;
the dispatch mode module is for selecting a pedestrian mode based on the pedestrian speed; and
the notification module is for updating the local notification based on detecting the pedestrian speed changed for displaying on the device.

23. The system as claimed in claim 18 further comprising:
an input module, coupled to the rate setter module, for receiving an entry for a category of interest; and
wherein the notification module includes:
a notice generator module for generating the local notification for the category of interest within the delivery range; and
a notice updater module for updating the local notification for the category of interest based on detecting the distance changed from the current location to the destination within the delivery range.

24. The system as claimed in claim 18 further comprising:
a configurator module, coupled to the dispatch mode module, for setting a notification setting for customizing the local notification; and
wherein:
the notification module is for generating the local notification based on the notification setting.

* * * * *